United States Patent [19]

Hentschel

[11] Patent Number: 4,947,251

[45] Date of Patent: Aug. 7, 1990

[54] SUPPRESSION OF FLICKER EFFECTS IN A TELEVISION RECEIVER

[75] Inventor: Christian Hentschel, Braunschweig, Fed. Rep. of Germany

[73] Assignee: Blaupunkt-Werke GmbH, Hildesheim, Fed. Rep. of Germany

[21] Appl. No.: 277,227

[22] Filed: Nov. 29, 1988

[30] Foreign Application Priority Data

Dec. 2, 1987 [DE] Fed. Rep. of Germany ....... 3740826

[51] Int. Cl.$^5$ ...................... H04N 7/01; H04N 11/20; H04N 5/208
[52] U.S. Cl. ..................................... 358/166; 358/11; 358/140
[58] Field of Search ........................ 358/11, 140, 166

[56] References Cited

U.S. PATENT DOCUMENTS

| | | | |
|---|---|---|---|
| 4,435,728 | 3/1984 | Raven et al. | 358/140 |
| 4,598,309 | 7/1986 | Casey | 358/11 |
| 4,625,239 | 11/1986 | Vreeswijk et al. | 358/140 |
| 4,663,653 | 5/1987 | Patel | 358/11 |
| 4,672,445 | 6/1987 | Casey et al. | 358/11 |
| 4,677,482 | 6/1987 | Lewis, Jr. | 358/11 |

FOREIGN PATENT DOCUMENTS 0262927 4/1988 European Pat. Off. .

*Primary Examiner*—John K. Peng

*Attorney, Agent, or Firm*—Frishauf, Holtz, Goodman & Woodward

[57] ABSTRACT

A received video signal, in which a complete picture is made up of two line-interlaced picture fields that are successively transmitted, is converted in two different ways into respective video signals of the same vertical scan frequency in which a full complement of television lines is provided in each vertical scan interval. In a first conversion favorable to picture contents in which there is considerable motion, there are added, to the lines of one picture field of the received signal, a set of interpolated lines derived from the lines of that field. In a second conversion designed to avoid flicker at horizontal edges in the picture, the lines of two successive picture fields of the received signal are used to make up a full complement of lines. Both conversions involve time-compressing the lines so that a full complement of lines can be transmitted in a vertical scan interval. An edge detector which provides an edge signal when successive lines of a field of the received signal show a certain degree of consistent contrast are used to control a fading circuit which makes the second conversion dominant when an edge is detected and allowing the first conversion to be provided to the output when no edge is detected. The use of two edge detectors simultaneously acting on successive fields is useful to avoid failure to respond to a very narrow horizontal streak. The hardware implementation is economical and avoids the use of expensive picture motion detectors.

7 Claims, 6 Drawing Sheets a)

b) V1:

c) V2:

K:

$A = (1-k) \cdot V1 + k \cdot V2$

SUPPRESSION OF FLICKER EFFECTS IN A TELEVISION RECEIVER

This invention concerns apparatus in a television receiver for suppressing disturbance of the received picture by flicker effects and a method reducing flicker at horizontal edges in a television picture content with minimum side effects on other aspects of picture quality.

The quality of television transmission is affected considerably by system parameters such as picture field frequency, line count and signal band width, for example. The frequency at which pictures succeed each other in television reproduction must not be too low, in order that the vertical blanking intervals allowing the electron beam trace to return to the top of the screen would not produce noticeable flicker, and also in order that motion in the picture may be perceived as continuous. In the interest of obtaining as high resolution as possible in the picture it is necessary to have a line count that is as high as possible. Both of these requirements call for a high signal bandwidth.

In setting the standards of television systems in general use today, compromises were made between the expense levels likely to be incurred by the available technology at the time of standarization and the highest achievable picture quality. A quality improvement was economically accomplished at that time by the so-called line jump process by which a complete television picture (sometimes called a "frame" by analogy to photographic motion pictures) was specified to have an odd number of television lines and was then divided into two interlaced picture fields. The viewer's eye did not distinguish the two picture fields from each other at a normal observing distance. In current TV systems it is not the picture or "frame" frequency of 25 Hz (Europe) or 30 Hz (North America), but rather the picture field frequency of 50 Hz or 60 Hz that determines the flicker effect.

The assumption that the picture field frequency determines the amount of flicker is valid only under certain postulated conditions. In particular, it does not hold when in the picture content being transmitted there are structures of the order of magnitude of the width of a line or structures forming a contrasty transition in the vertical direction. Thus, for example, a horizontally running edge, in so far as it represents a sufficiently sharp luminance transition, may not be picked up by a certain line of a first picture field during the linewise scan from top to bottom of that field and then first picked up by the next line of that same field which immediately follows the first mentioned line. The scanning, in the next picture field, of the line lying between the two lines of the first field just mentioned may then pick up the transition. Since individual lines of a complete picture are scanned, transmitted and reproduced only at a frequency of 25 Hz, the edge of the transition above-described appears to jump up and down by one line width at a 25 Hz or 30 Hz rythm. This so called edge flicker can be extremely annoying when it appears in the kind of picture content just described.

Measures have accordingly been taken for avoiding large surface flicker effects and also for reducing edge flicker. Thus the picture field frequency, which is also the vertical scanning frequency is raised, so that the flickering of large bright surfaces is avoided. With the raising of the vertical frequency, however, the repetition of the original picture fields or the composition of new picture fields out of the original picture fields is necessary. Various methods have become known for such procedures.

The methods just mentioned do not provide an improvement regarding flicker to the same extent for all kinds of picture content. The repetition of pictures for the purpose of raising the picture field frequency is disturbingly noticeable in the reproduction of motion in the picture. To avoid this disadvantage, more elaborate schemes for picture flicker correction have become known, for example from U.S. Pat. Nos. 4,435,728 and 4,625,239, in which a motion detector is used to switch between different kinds of corrections. A motion detector requires at least a picture field memory just for detecting motion and accordingly involves considerable additional expense.

SUMMARY OF THE INVENTION

It is an object of the present invention to provide suppression of flicker disturbances in reproduced pictures in a television receiver and to do so at the lowest possible cost while providing picture suppression while still preserving good reproduction of moving events in the pictures. At the same time the avoidance of large area flicker disturbances which are produced by low vertical scan frequency, of course, must be preserved.

Briefly, a received video signal in which each complete picture is composed of two interlaced picture fields transmitted in succession is converted in two different ways into a video signal having the same vertical scan frequency and transmitting a full complement of television lines in an interval equal to the picture field interval of the received signal. One of the two converters used for this purpose makes a conversion which is particularly effective for reducing edge flicker while the other makes a conversion favorable to the reproduction of picture motion. Means are provided for detecting the presence of horizontal picture edges at least in the luminance content of the received video signal and are used to control switchover or fading between the outputs of the two converters and thus to supply a corrected video signal having the same scan frequency as the original received signal. Both converters use time compression which shortens the time required for each line and allows full complement of lines to be supplied in each vertical scanning interval.

The type of conversion referred for exclusive or predominant use when there is no significant horizontal edge content in the picture is a conversion which utilizes only the content of a single picture field to provide the remainder of the full complement of lines by repetition or averaging interpolation. This provides excellent reproduction of picture content which is in motion. In the presence of a horizontal picture edge at least in the luminance content of the received signal a conversion is used in which combinations are made of overlapping pairs of successive picture fields, to provide a full complement of lines. In this scheme only alternate pairs will combine fields of the same full picture. This type of converter is remarkably successful in suppressing edge flicker. Both types of conversion suppress interline flicker, since a full complement of lines provided in each vertical scanning interval, so that all lines of large bright areas will be illuminated with the vertical scanning frequency, which is high enough to overcome large bright area flicker.

It is possible to implement these video signal conversions, horizontal edge detection, and switching or fading between converter outputs with relatively simple and low expense equipment. These possibilities are better described in the illustrated description that follows:

BRIEF DESCRIPTION OF THE DRAWINGS

The invention is described below by way of illustrative example with reference to the annexed drawings in which:

FIG. 5b is a graphical representation, in a multiplicity of levels having the same time dimension shown horizontally, for explaining the operation of the circuit of FIG. 5a;

DESCRIPTION OF THE ILLUSTRATED EMBODIMENTS

In the various figures of the drawings the same components are designated by the same reference numerals. Before the apparatus of the invention is discussed, however, it is important to explain the mode of operation which the apparatus is designed to carry out in a television receiver.

Figure 1:
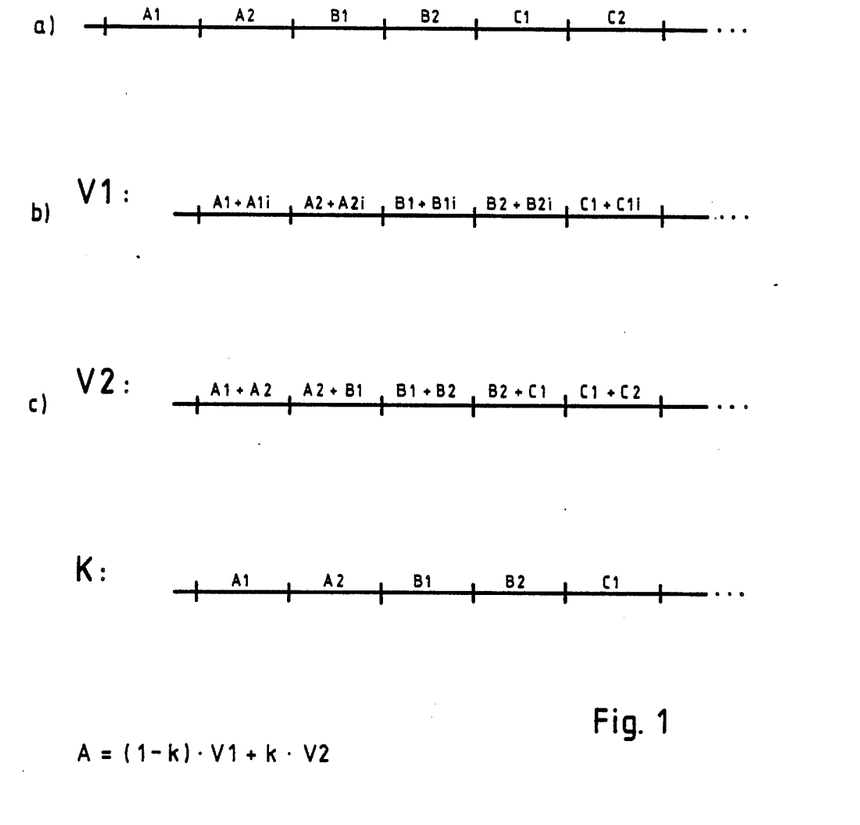
FIG. 1 is a multiple-line diagram, having a single time scale showing the content in successive picture field intervals of a received video signal and converted video signals typically provided elsewhere in apparatus of the invention, as well as of a signal supplied to an edge detector.

Line (a) of FIG. 1 shows the sequence of three television pictures ("frames") each composed of two picture fields in accordance with the above-described line-jump interlaced scanning method. Thus the pictures fields A1 and A2 compose the complete picture A, the fields B1 and B2 similarly belong to a complete picture B, the fields C1 and C2, to a complete picture C, and so on. In the case of video signals according to the European 625 line standard a picture field occupies the time interval of 20 ms. In the American 525 line standard each picture field fits within an interval of 16.667 ms.

In accordance with the invention the received television signal represented in line (a) of FIG. 1 is to be converted into a signal having the same vertical scan frequency without a line jump (i.e. without interlacing the line transmission sequence). The result of such a conversion is to provide a complete picture within the picture field interval or vertical scan period of the received signal.

Line (b) shows a first kind of conversion of the signal of line (a) meeting the above stated objective, in this case producing each complete picture entirely from the information contained in a single picture field. In the case of such a conversion there is no disturbance of the course of motion in the picture content because there is no longer any time-wise interlacing such as there was in the signals originally received. In this case, in order to obtain continuous progressive scanning without interlacing, the lines missing in each transmitted picture field are obtained by interpolation in the vertical direction. This can be done by a simple way by repeating the lines of the field or, for a better interpolation, by averaging pixels of every pair of successive lines of the field.

Figure 2:
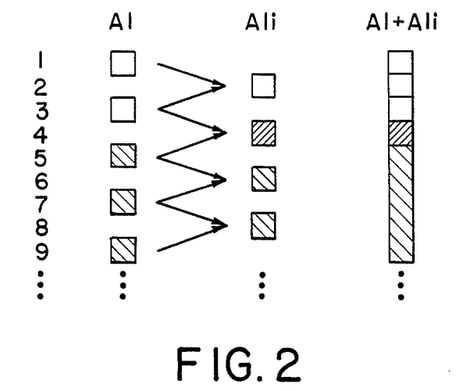
FIG. 2 is a diagram showing how the respective picture contents of successive picture fields illustrated in line (b) of FIG. 1 are constituted.

The last mentioned interpolation procedure is illustrated schematically in FIG. 2 for several lines of a picture field.

The lines 1 and 3 of the picture field A1 shown in the first column of FIG. 2 and therefore also the corresponding lines of the complete picture shown in the third column of FIG. 2, have a white picture content, whereas the line 5, 7 and 9 have a black picture content. The even numbered line of the complete picture are each derived by interpolation to successive lines of the picture field A1 of the received signal. In this way the line 2 has an amplitude corresponding to the luminance white, the line 6 and 8 show black, while the luminance which is reproduced by the line 4 corresponds to an average value (grey). The luminance values of the lines of the complete picture formed by the conversion process shown in FIG. 2 are represented one below the other in the third column of FIG. 2 in the simple fashion just described. The formula A1 + A1i provided as a heading at the top of the third column of FIG. 2 represents no mathematical addition, but rather the obtaining of the odd numbered lines directly from the first picture field A1 and the obtaining of the even numbered lines by interpolation of averages.

Figure 3:
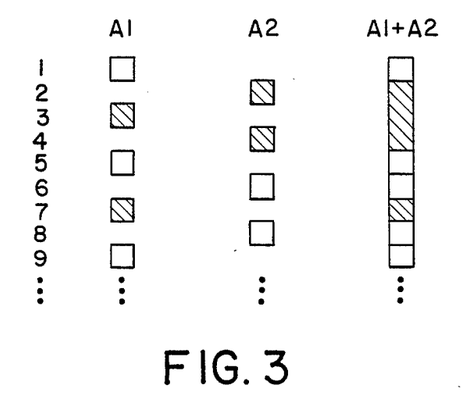
FIG. 3 is a diagram like FIG. 2 for showing how the respective picture contents of successive fields illustrated in line (c) of FIG. 1 are constituted.

Line (c) of FIG. 1 and all of FIG. 3 illustrate the conversion of the received video signal into a signal providing a picture with a full complement of lines in each picture field interval which can overcome edge flicker. This type of video signal conversion is used in accordance with the invention when an edge detector indicates the presence in the picture content of a horizontally running edge (i.e. an edge at which there is a vertical contrast). In comparison with FIG. 2 this example of conversion provides a different complement of lines. In this case each complete picture line array is composed of the lines of two successive picture fields. In the case illustrated in FIG. 3 the lines of the successive picture fields A1 and A2 provide the correspondingly numbered lines of the complete picture designated A1+A2.

Line (c) of FIG. 1 shows that in this type of conversion, between the full picture A1+A2 and the full picture B1+B2 there is interposed a full picture A2+B1. This scheme of conversion can be described as combining picture fields in successive overlapping pairs, since two successive full pictures always have one common set of lines, from the same picture field. All of the complete pictures resulting from this type of conversion of the received signal are written onto the picture screen within a picture field interval (i.e. within the period of a single vertical scan of the screen).

The video signals converted in the manner just described are completely immune to horizontal edge flicker. For example line 5 of the video signal, as received originally and as normally reproduced, would appear only once in each complete picture, and therefore would be written once in a 40 ms interval under the European standard. The corresponding position on the picture screen would therefore be illuminated only every 40 ms or half that interval. In the converted video signals without interlacing, according to FIG. 3, line 5 would be illuminated every 20 ms, thus preventing edge flicker.

Line (d) of FIG. 1 shows the information which is provided to what may be called an edge detector, which serves to switch between the two types of signal conversions respectively illustrated in FIGS. 2 and 3. This line of FIG. 1, as shown, is simply the received video signal delayed by one picture field interval, in order to put it in step with the converted video signals rather than with the received video signal.

The circuits of the edge detectors are discussed further below in connection with FIGS. 6 and 7. In principle the edge detector will select between the converted video signal of the kind shown in FIG. 2 and the converted video signal of the kind shown in FIG. 3 according to whether a horizontally running edge of vertical contrast is present in the picture content of the received video signal.

Although the edge detector could be used to control a simple changeover switch, it is preferably designed to control a blending or "fading" circuit so that the transition from one type of converted video signal to another can be faded in and out while a horizontal running edge becomes, and later ceases to be, a significant part of the picture content of the received video signal.

Figure 4:
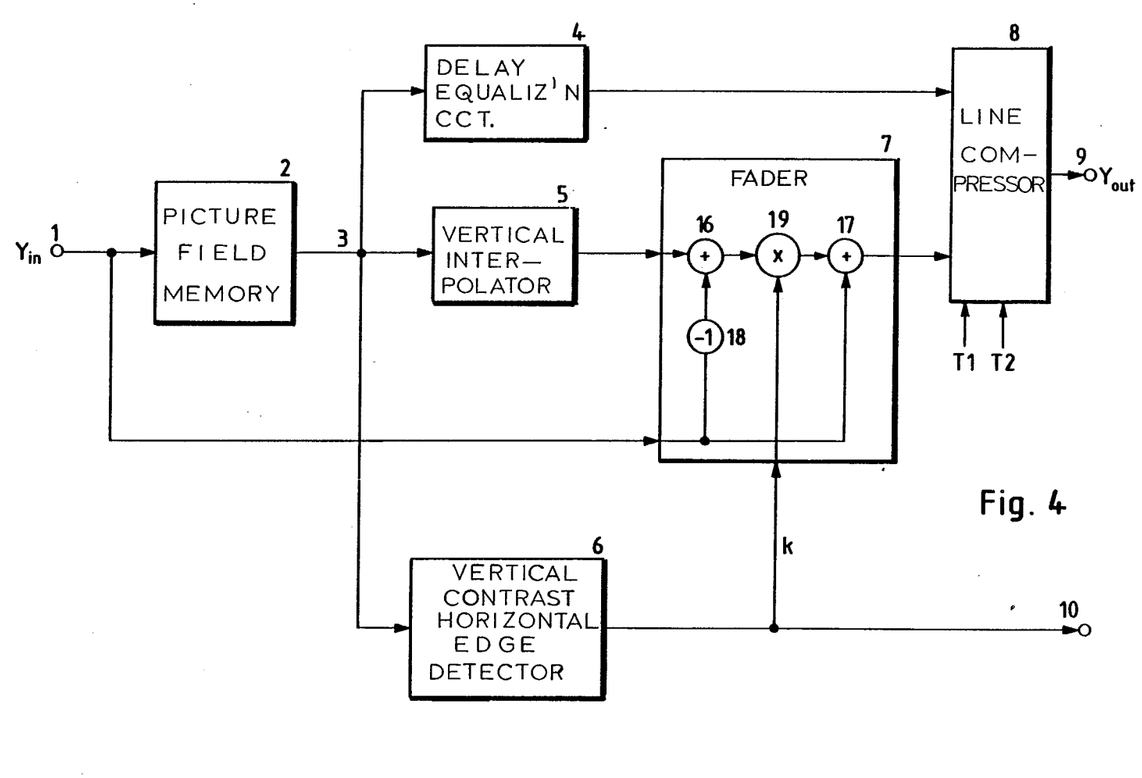
FIG. 4 is a block circuit diagram of a first embodiment of the invention.

FIG. 4 shows a block circuit diagram of a first embodiment of the invention in which the received video signal is separately converted in accordance with FIG. 2 and in accordance with FIG. 3 to produce video signals of the respected kinds diagrammed in lines (b) and (c) of FIG. 1. It should be mentioned at this point that the invention is useful both for black and white and for color television signals. A multiplex television signal can be processed or the chrominance and the luminance information can be processed in parallel in apparatus operating in basically the same way. The vertical interpolation operation must of course be suited to the particular color television standard for the received video signals. Although separate edge detectors for color and for luminance may be used, it is also practical to control the processing of the chrominance signals, in accordance with the invention, by an edge detector that evaluates only the luminance signal.

The block circuit diagram of FIG. 4 shows, by way of example, the circuits for a luminance signal Y which is supplied as the signal Y into the input 1 of the circuit of FIG. 4. That signal then goes from the input 1 to a picture field memory 2, at the output of which the signal delayed by one picture field interval is made available. From the output 3 of the picture field memory 2 the delayed received signal is supplied to the respective inputs of a delay circuit 4, a vertical interpolator 5 and a vertical contrast horizontal edge detector 6. The output signal k of the edge detector 6 controls a fading circuit 7 in such a way that when horizontal edges showing vertical contrast are present in the input signal Y the input Y is provided at, the output of the fading circuit 7 for further processing. In other cases the output signal of the vertical interpolator 5 is supplied to the output of the fading circuit 7. Vertical interpolators are well known in the art do not need to be further explained in connection with the present invention. They contain, basically, at least one line interval delay circuit in a circuit for producing the average pixel value of a pair of corresponding pixels respectively from successive lines.

The fading circuit 7 contains two addition circuits 16 and 17, an inverting circuit 18, and a multiplying circuit 19 in order to provide an output signal conforming to the above-mentioned formula $$A = (1-k)*V1 + k*V2$$

wherein * designates a multiplication.

In the edge detector 6 signals of two or more successive lines are compared with each other in the manner well known in the art. Consistent deviation of compared signals from each other is evaluated as an edge in which case the output of the vertical contrast horizontal edge detector 6 rises up to a maximum signal k=1. If no such edge is present, then k=0. In the simplest case, if only two conditions are recognized and reported (k=1 or k=0), the fading circuit can be replaced by a changeover switch.

Both the output signal of the delay circuit 4, by which compensation is provided for the propagation time of the signals passing through the vertical interpolator and through the fading circuit 7, and the output signal of the fading circuit 7 are supplied to a line compressor 8 which is composed essentially of a number of single line memories. In these memories the supplied signals are written in at a first rythm having a period T1 and read out with a second rythm having a period T2 which is half of T1, so that the rythm has twice the frequency of the first. In consequence, a doubling of the line frequency and a halving of the line period is obtained, which is necessary in order that a picture having a full complement of picture lines can be supplied during a picture field interval of the received video signal at the output 9 for the video signals to be reproduced (displayed) by the television receiver. An additional output 10 is provided for the output signal of the vertical contrast horizontal edge detector 6, for example for use in controlling a circuit similar to FIG. 4 for a chrominance signal.

As can be readily seen in FIG. 1, the signals of the past previous picture field are necessary both for the signal shown in line (b) of FIG. 1 (referred to as V1 in the fading circuit control formula) and for the signal of line (c) of FIG. 1, (referred to as V2 in the formula just mentioned). For this reason the output signal of the delay circuit 4 is continuously supplied to the line compressor 8 which may be referred to as a time compression and line interleaving circuit. If no vertical contrast horizontal edge is present, there is supplied to the line compressor also the output signal of the vertical interpolator 5, which consists of the line sequences A1i, A2i, B1i, B2i . . . as these values are designated in line (b) of FIG. 1 and illustrated for the first of these in the middle column of FIG. 2. When a vertical contrast horizontal line is present in the received picture content, the fading circuit 7 is so controlled that the signal of the next picture field (undelayed) namely the fields A2, B1, etc. are additionally supplied to the signals provided by the delay circuit 4 to the line compressor 8, so that the video signal corresponding to line (c) of FIG. 1 and to the third column of FIG. 3 is put together in the line compressor 8 and made available at an output 9.

Figure 5A:
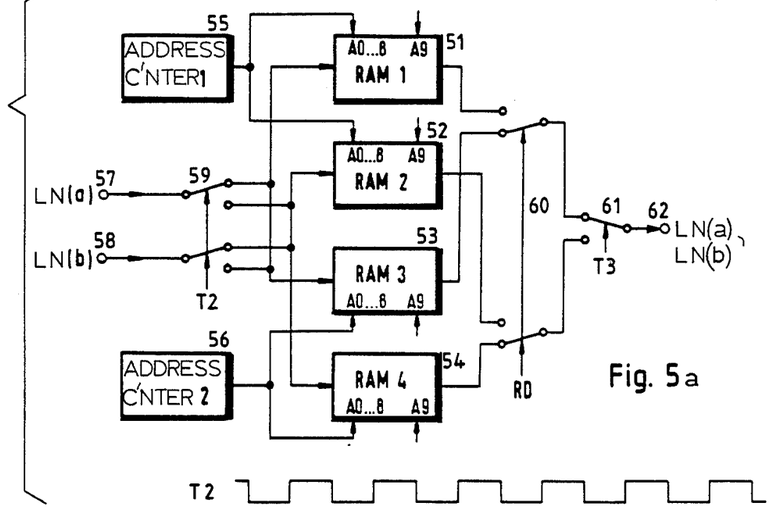
FIG. 5a is a block circuit diagram of a time compression and line complement completion device for use in the circuit of FIG. 4.

FIG. 5(a) shows an illustrative example of a circuit for the line compressor 8, in which there is full utilization of memory capacity at a processing speed that is as low as possible. There are shown four read-write memories of the random access type (RAM) 51, 52, 53 and 54. At all times two of these memories are controlled by a first address counter 55 and two more by a second address counter 56. Each of the address counters 55 and 56 generates nine places (bits) of the address while a tenth place A9 is externally supplied.

Figure 5B:
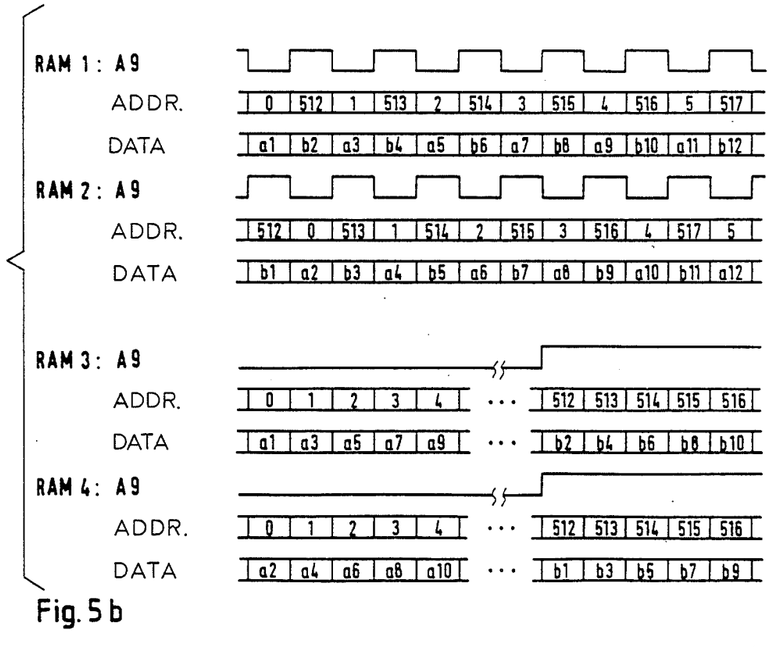

FIG. 5(b) is a timing diagram of the inputs FIG. 5(a) for the setting of the switches 60 and 61 shown in FIG. 5(a). The first line of FIG. 5(b) shows the operation of the switch 59 of FIG. 5(a) by the control signal T2. The signals of two lines, shown as line (a) and line (b), are supplied at inputs 57 and 58 of FIG. 5(a) and are distributed to the write-in inputs of the memories 51 to 54 controlled by the control signal T2 shown in the first line of FIG. 5(b).

The outputs of the memories 51 to 54 are switched by the output switches 60 and 61 to the output terminal 62.

While the memories 51 and 52 are being written into the memories 53 and 54 are being read-out. The memories 51 and 52 are alternatingly written into with data from the lines (a) and (b). In this operation complementary signals at the rythm of the switch control signal T2 are supplied at the respective address inputs A9 of the memories 51 and 52. The result is that the addressing of line (a) begins counting upward from the address 1 while the addressing of line (b), on the other hand, counts up from the address 512.

In read-out the memory addresses A9 are first set at 0. Two data words of the line (a) are always present in consequence. The switches 60 and 61 which operate as output multiplexers assure that the data reach the output in the correct sequence at twice the line speed. After the line (a) has been read out the addresses A9 are switched to the value 1 and the line (b) is read-out. The read-out procedure is shown in the lower part of FIG. 5(b) as if the switch 60 had been thrown from the position shown in FIG. 5a to the position for reading out the contents of the memories 51 and 52.

The control signal T3 interleaves the even numbered data a2, a4 . . . with the odd numbered data a1, a3 . . . and later does the same for the line b, there being 512 pixels per line in this example. The control signal T3 has twice the frequency of the control signal T2. The control signal RD is timed to read out memories 53 and 54 while memories 51 and 52 are being written into, and vice versa. Write-enable and read-enable signals of corresponding timing are of course supplied to the memories by means not shown at the line frequency of the received video signal.

The advantage of the circuit illustrated in FIG. 5(a) lies in the fact that the memories always operate at the same maximum data rate and are optimally utilized time-wise. A doubling of the data rate within the memories, as indicated by way of oversimplification in connection with FIG. 4, would greatly increase the expense, and the maximum data speed would be effectively used only during read-out.

Figure 6:
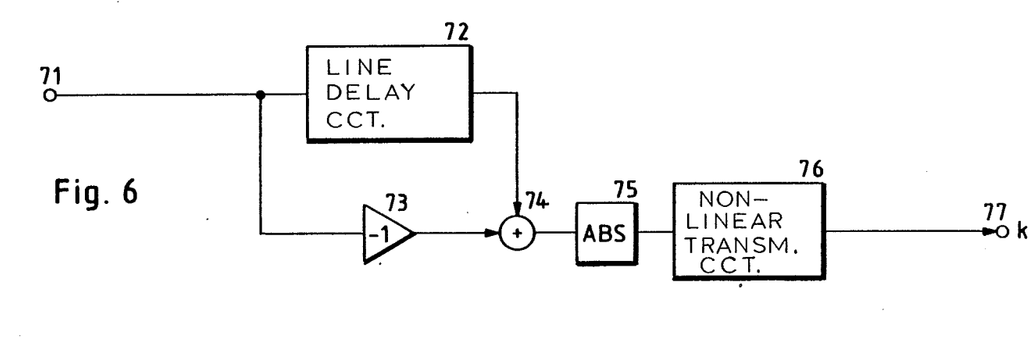
FIG. 6 is a block circuit diagram of a first embodiment of a contrast edge detector.
Figure 7:
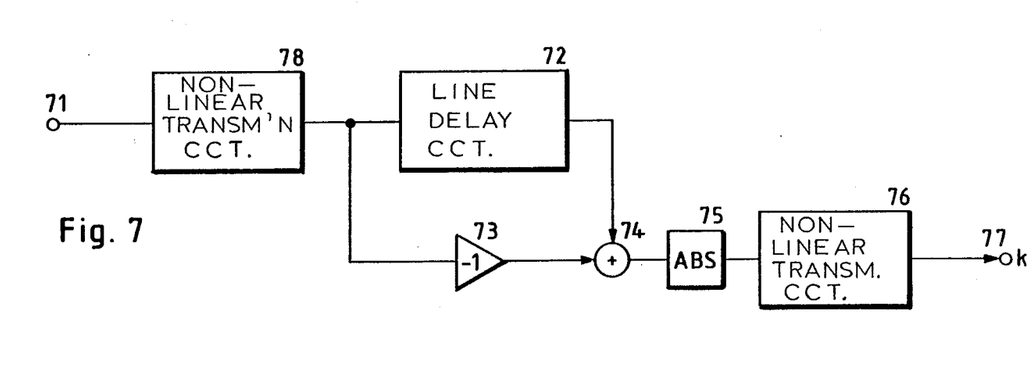
FIG. 7 is a block circuit diagram of a second embodiment of a contrast edge detector.

FIGS. 6 and 7 show illustrative examples of edge detector circuits. In FIG. 6 the received video signal, made available at an input 71 of the circuit goes, on the one hand, to a one line delay circuit and on the other hand to an inverting circuit 73. The respective outputs of the delay circuit 72 and the inverter circuit 73 go to the inputs of an addition circuit 74, which by virtue of the inversion provided by the circuit 73, generates at its output the difference between the delayed and nondelayed signals.

According to the particular application, the delay circuit 72 may provide a delay of just one line, as already mentioned, or of two or more lines. In the case of a one line delay time, amplitude differences of two successive lines are recognized as an edge. The difference signal from the circuit 74 is put through the circuit 75 for forming the absolute value of the difference (independent of sign) and then through a nonlinear circuit 76, after which the fully processed reference signal is made available at the output 77 from which the it is transmitted to the fading circuit 7 (FIG. 4) where it functions as the variable signal k in the above-mentioned equation which characterizes the operation of the fading circuit 7.

The evaluation characteristic of the nonlinear circuit 76 depends upon the requirements of the particular case. Thus, it can for example be advantageous to evaluate relatively small difference signal values as less significant than relatively large difference signal values. This would involve a circuit in which an amplification factor is made to increase with the size of the input signal or in which an attentuation factor is made to decrease with the size of the input signal.

The edge detector circuit of FIG. 7 differs from the embodiment shown in FIG. 6 by having an additional nonlinear circuit 78 which processes the input signal.

Figure 8:
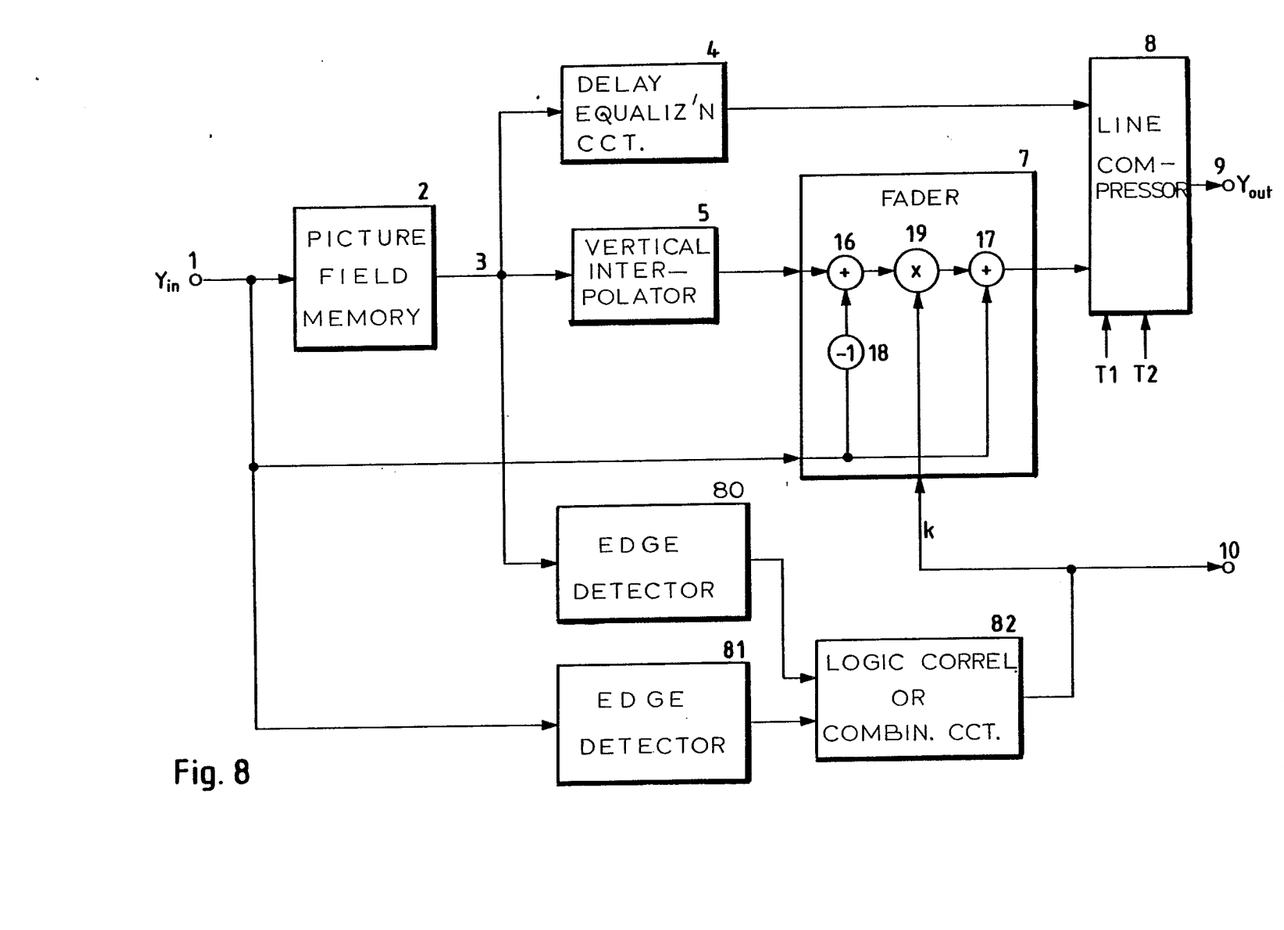
FIG. 8 is a block circuit diagram of a second embodiment of apparatus according to the invention in which two vertical-contrast horizontal-edge detectors are used.

FIG. 8 shows a second embodiment of apparatus according to the invention which differs from the embodiment of FIG. 4 in that a second edge detector 81 having its input connected to the input of the picture field memory 2 is provided in addition to the edge detector 80 which is connected in the same way as the single edge detector 6 of FIG. 4 (to the output of the picture field memory 2). The output signals of both edge detectors 80, 81 are supplied through a circuit 82 to the fading or blending circuit 7. These edge detectors are both, like the other edge detectors referred to herein, vertical-contrast horizontal-edge detectors.

The presence of the second edge detector 81 improves the recognition of horizontally running edges for certain picture contents. This will now be explained by reference to a picture content feature that represents a horizontal line. For this purpose it is assumed that the horizontal line so narrow that it is picked up by only one line of the picture. Each edge detector 80, 81, being such, for example, as shown in FIG. 6 or FIG. 7, evaluates two successive lines of a picture field. If the contrasting single horizontal line assumed above is absent in a particular picture field of the received signal, but is present in the following or preceding picture field, the edge detector to which the particular picture field is presented does not respond.

In order that picture contents of the kind above-discussed (single line streaks) may be reproduced as free of flicker as possible, the video signal of a second picture field, which contains lines missing in the field whose lines are processed by the detector 80, is supplied to the additional edge detector 81 in FIG. 8 so that the additional edge detector will provide an edge signal when the contents of two neighboring lines of the second field are consistently different. Thus an edge detectable in only one field of each picture of the received video signal will not fail to be detected in any vertical scan interval while the edge remains so located in the picture content of the received video signal.

The nonlinear evaluation circuits 76 of FIGS. 6 and 7 may be designed to provide two step or multiple step edge detection output signals. According to the kind of output signals that the edge detectors 80 and 81 provide in FIG. 8, the circuit 82, to which the outputs of these edge detectors are supplied for correlation, may be a correlation logic circuit, preferably an OR gate, but possibly something more elaborate, or an interpolation circuit such as an averaging circuit or some combining circuit that favors the larger signal according to some criterion.

Although the invention has been described with reference to particular illustrative examples, it will be recognized that further variations and modifications are possible within the inventive concept.

I claim:

1. Apparatus in a television receiver for flicker suppression in the processing of a received television signal wherein each complete picture is composed of two interlaced picture fields transmitted in succession, comprising:

first signal converting means (2, 17, 4, 8) for converting a said received video signal into a first derived video signal having the same vertical scan frequency and transmitting a full complement of television lines in an interval equal to the picture field interval of said received video signal, said first converting means including means (2, 17) for combining, by deinterlaced line sequencing, each pair of successive picture fields into a single field of a vertically progressive sequence of a full complement of television lines;

second signal converting means (5, 4, 8) for converting said received video signal into a second derived video signal having the same vertical scan frequency and transmitting a full complement of television lines in an interval equal to the picture field intervals of said received video signal, said second converting means including means (5) for deriving from each picture field of said received video signal a set of lines derived from the lines of said field for interleaving between the lines of said field and means for sequencing said lines of said field and said derived set of lines in interleaved sequence;

time compression means (8) for cooperating as part of said combining means of said first signal converting means and of said line sequencing means of said second converting means for respectively providing said first and second derived video signals of the same vertical scan frequency as said received video signal and containing in each field a progressively sequenced full complement of television lines; and means for detecting (6) the presence of substantially horizontally running vertical-contrast edges in the content of each said picture field of said received video signal and for relative fading (7) of said first and second derived video signals dependent upon the detection of a said edge, in such a manner that said first derived video signal will be predominant at a final output of said apparatus when no said edge is being detected and said second derived video signal will be predominant at said output when a said edge is being detected.

2. Apparatus as defined in claim 1, wherein said means in said second converting means for deriving a set of lines from the lines of each field of said received video signal is constituted as means for deriving an interpolation line from each pair of successive lines of said field of said received video signal.

3. Apparatus as defined in claim 1, wherein said means in said second converting means for deriving a set of lines from the lines of each field of said received video signal is constituted as means for producing repetitions of respective lines of each field of said received video signal.

4. Apparatus as defined in claim 2, wherein a picture field memory (2) is provided for implementing said first and second converting means, having an input to which said received video signal is supplied, to which input there are connected a first input of said relative fading means and having an output providing said received video signal with a delay of one field interval;

vertical-interpolator means (5) are provided in said line set deriving means of said second signal converting means, having an input connected to said output of said picture field memory (2) and an output connected to a second input of said relative fading means (7), said output of said picture field memory also being connected to an input of said edge detecting means (6; 80, 81, 82); and a delay equalizing circuit (4) is provided having an input connected to said output of said picture field memory (2) and an output connected to a first input of said time compression means (8), said edge detecting means having an output connected to a control input of said relative fading means (7) and said relative fading means having an output connected to a second input of said time compression means (8), said field pair combining means and line sequencing means respectively of said first and second signal converting means being built into said time compression means (8; FIG. 5a).

5. Apparatus as defined in claim 4 wherein said edge detecting means (6; 80, 81, 82) is responsive only to the luminance content of each said picture field of said received video signal.

6. Apparatus as defined in claim 4, wherein said means for detecting the presence of substantially horizontally running vertical-contrast edges in the content of said received video signal includes first (80) and second (81) edge detectors both equipped to compare successive lines of a picture field and produce a resulting difference signal, said first edge detector (80) having an input connected to said output of said picture field memory (2) and said second edge detector having an input connected to said input of said picture field memory (2), said edge detectors (80, 81) having outputs respectively connected to two inputs of a correlation circuit (82) for taking advantage of edge detection regardless of which of said edge detectors acts, said correlation circuit having an output connected to said control input of said relative fading means, whereby simultaneous edge detection in two successive picture fields of said received video signal is available in each vertical scanning interval.

7. Apparatus as defined in claim 6 wherein said edge detecting means (80, 81, 82) is responsive only to the luminance content of each said picture field of said received video signal.

* * * * *